United States Patent
Peng et al.

(10) Patent No.: US 12,114,310 B2
(45) Date of Patent: Oct. 8, 2024

(54) INFORMATION TRANSMISSION METHOD AND TERMINAL

(71) Applicant: VIVO MOBILE COMMUNICATION CO., LTD., Guangdong (CN)

(72) Inventors: Shuyan Peng, Chang'an Dongguan (CN); Zichao Ji, Chang'an Dongguan (CN); Huaming Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 371 days.

(21) Appl. No.: 17/591,820

(22) Filed: Feb. 3, 2022

(65) Prior Publication Data

US 2022/0159694 A1     May 19, 2022

Related U.S. Application Data

(63) Continuation of application No. PCT/CN2020/102332, filed on Jul. 16, 2020.

(30) Foreign Application Priority Data

Aug. 9, 2019   (CN) .......................... 201910736188.9

(51) Int. Cl.
*H04W 72/20* (2023.01)
*H04W 72/25* (2023.01)

(52) U.S. Cl.
CPC ........... *H04W 72/20* (2023.01); *H04W 72/25* (2023.01)

(58) Field of Classification Search
CPC ...... H04L 1/1812–1819; H04W 56/001–0015; H04W 72/25; H04W 76/28
See application file for complete search history.

(56) References Cited

U.S. PATENT DOCUMENTS

| | | | |
|---|---|---|---|
| 2020/0106566 A1* | 4/2020 | Yeo ........................ | H04L 1/1854 |
| 2020/0266857 A1* | 8/2020 | Hwang .................. | H04W 72/23 |
| 2020/0305126 A1* | 9/2020 | Li .......................... | H04L 1/1614 |
| 2021/0075552 A1* | 3/2021 | Huang ................... | H04L 1/1864 |
| 2021/0127364 A1* | 4/2021 | Panteleev ............. | H04L 1/1819 |
| 2021/0204250 A1* | 7/2021 | Ashraf ................... | H04W 4/40 |
| 2021/0306824 A1* | 9/2021 | Li ........................... | H04W 4/40 |
| 2021/0345313 A1* | 11/2021 | Basu Mallick ....... | H04L 1/1825 |
| 2022/0061041 A1* | 2/2022 | Chen ..................... | H04L 5/0048 |

(Continued)

FOREIGN PATENT DOCUMENTS

| | | |
|---|---|---|
| WO | 2017045499 A1 | 3/2017 |
| WO | 2020165713 A1 | 8/2020 |

OTHER PUBLICATIONS

European Search Report dated Sep. 8, 2022 as received in application No. 20852604.6.

(Continued)

*Primary Examiner* — Brendan Y Higa
(74) *Attorney, Agent, or Firm* — Brooks Kushman P.C.

(57) ABSTRACT

An information transmission method and a terminal are provided. The method includes: transmitting first sidelink control information SCI, second SCI, and sidelink feedback control information SFCI according to a resource mapping pattern, where the resource mapping pattern is used to indicate transmission resources of the SFCI and a physical sidelink shared channel PSSCH jointly scheduled by the first SCI and the second SCI.

20 Claims, 7 Drawing Sheets

(56) References Cited

U.S. PATENT DOCUMENTS

| | | | |
|---|---|---|---|
| 2022/0086860 A1* | 3/2022 | Panteleev | H04W 4/40 |
| 2022/0140964 A1* | 5/2022 | Chen | H04L 5/0048 |
| | | | 370/330 |
| 2023/0102142 A1* | 3/2023 | Kim | H04W 72/1263 |
| | | | 370/329 |

OTHER PUBLICATIONS

"Sidelink physical layer procedures for NR V2X communication" 3GPP TSG RAN WG1 Ad-Hoc Meeting 1901, R1-1900481, Jan. 21, 2019. Intel Corporation.

"Physical layer procedure for NR sidelink" 3GPP TSG RAN WG1 Meeting #96, R1-1901683, Feb. 25, 2019. Vivo.

"On sidelink physical layer structure" 3GPP TSG RAN WG1 #96, R1-1901809, Feb. 25, 2019. MediaTek Inc.

"Featuring lead summary#2 for 7.2.4.1 Physical layer structure for sidelink" 3GPP TSG RAN WG1 #96bis Meeting, R1-1905725, Apr. 8, 2019. Samsung.

"Discussion on sidelink structure in NR V2X" 3GPP TSG RAN WG1 #97, R1-1907367. May 13, 2019. ASUSTeK.

Indian Office Action dated Jul. 27, 2022 as received in application No. 202227012751.

"Discussion on physical layer structure for NR sidelink" 3GPP TSG RAN WG1 #97, R1-1907012. May 13, 2019. LG Electronics.

Huawei, et al., "Sidelink reference signal design for NR V2X," 3GPP TSG RAN WG1 Meeting #97, R1-1906009, pp. 1-11, (May 13-17, 2019).

MediaTek Inc., "Discussion on sidelink physical layer structure, " 3GPP TSG RAN WG1 #97, R1-1906553, pp. 1-16, (May 13-17, 2019).

JP Office Action dated Mar. 28, 2023 as received in Application No. 2022-507786.

First Office Action for Korean Application No. 10-2022-7008016, dated May 24, 2024, 7 Pages.

OPPO "Physical layer procedure for NR-V2X" 3GPP TSG RAN WG1 #96, Athens, Greece, Feb. 2019, R1-1902386, 9 Pages.

Huawei, HiSilicon "Design and contents of PSCCH and PSFCH" 3GPP TSG RAN WG1 Meeting #96bis, Xi'an, China, Apr. 2019, R1-1904689, 9 Pages.

Ericsson "PHY layer structure for NR sidelink" 3GPP TSG-RAN WG 1 Meeting #97, Reno, Nevada USA, May 2019, R1-1907134, 19 Pages.

* cited by examiner

INFORMATION TRANSMISSION METHOD AND TERMINAL

CROSS-REFERENCE TO RELATED APPLICATIONS

This application is continuation application of PCT International Application No. PCT/CN2020/102332 filed on Jul. 16, 2020, which claims priority to Chinese Patent Application No. 201910736188.9 filed with China on Aug. 9, 2019, which are incorporated in their entireties by reference herein.

TECHNICAL FIELD

This disclosure relates to the field of communications technologies, and especially, to an information transmission method and a terminal.

BACKGROUND

As shown in FIG. 1, a long term evolution (LTE) system can support sidelink for direct data transmission between user equipments (UE) without through a network device.

Sidelink transmission mainly includes the following transmission modes: broadcast), groupcast, and unicast. Unicast, as its name implies, is a one-to-one transmission. Groupcast is a one-to-many transmission. Broadcast is also a one-to-many transmission, but for broadcast, there is no concept that UEs belong to a same group. UE transmits sidelink control information (SCI) over a physical sidelink control channel (PSCCH), to schedule a physical sidelink shared channel (PSSCH) for data transmission.

LTE sidelink is designed to be applicable to specific public safety affairs (for example, emergency communication on a fire site or a disaster site such as an earthquake), vehicle to everything (V2X) communication, or the like. The vehicle to everything communication includes various services, for example, basic security communication, advanced (autonomous) driving, platooning, and sensor extension. LTE sidelink supports only broadcast communication, and therefore is mainly used for basic security communication. Other advanced V2X services with strict QoS requirements in terms of delay and reliability are supported by new radio (NR) sidelink.

However, in the new radio NR sidelink, unicast and groupcast support hybrid automatic repeat request (HARQ) feedback mechanisms, channel state information (CSI) measurement mechanisms, and the like, but broadcast does not support HARQ feedback mechanisms. This causes SCI for scheduling unicast or groupcast transmission to be much larger than SCI for scheduling broadcast transmission. If the SCI for broadcast is padded with 0 or 1 to reach a size of the SCI for unicast/groupcast, performance of the SCI for broadcast will be reduced. If no padding is performed, detecting SCIs of different sizes at a receive end will be more complex. Therefore, two-stage SCI transmission will be considered in NR sidelink.

In sidelink, unicast and groupcast transmissions support CSI measurement feedback. A CSI report obtained through measurement may be multiplexed and carried on a PSSCH, and fed back to UE transmitting a CSI-RS, and the UE reports the measurement result. CSI report information is part of sidelink feedback control information (SFCI). Therefore, how SFCI transmission is performed during two-stage SCI transmission has become a problem to be urgently resolved.

SUMMARY

According to a first aspect, some embodiments of this disclosure provide an information transmission method, including: transmitting first sidelink control information SCI, second SCI, and sidelink feedback control information SFCI according to a resource mapping pattern, where the resource mapping pattern is used to indicate transmission resources of the SFCI and a physical sidelink shared channel PSSCH jointly scheduled by the first SCI and the second SCI.

According to a second aspect, some embodiments of this disclosure further provide a terminal, including:
a transmission module, configured to transmit first sidelink control information SCI, second SCI, and sidelink feedback control information SFCI according to a resource mapping pattern, where the resource mapping pattern is used to indicate transmission resources of the SFCI and a physical sidelink shared channel PSSCH jointly scheduled by the first SCI and the second SCI.

According to a third aspect, some embodiments of this disclosure further provide a terminal, including a processor, a memory, and a program stored in the memory and capable of running on the processor, where when the program is executed by the processor, steps of the foregoing information transmission method are implemented.

According to a fourth aspect, some embodiments of this disclosure further provide a readable storage medium, where the readable storage medium stores a program, and when the program is executed by a processor, the steps of the foregoing information transmission method are implemented.

DESCRIPTION OF EMBODIMENTS

To make the to-be-resolved technical problems, technical solutions, and advantages of this disclosure clearer, the following provides detailed descriptions with reference to the accompanying drawings and specific embodiments.

Figure 1:
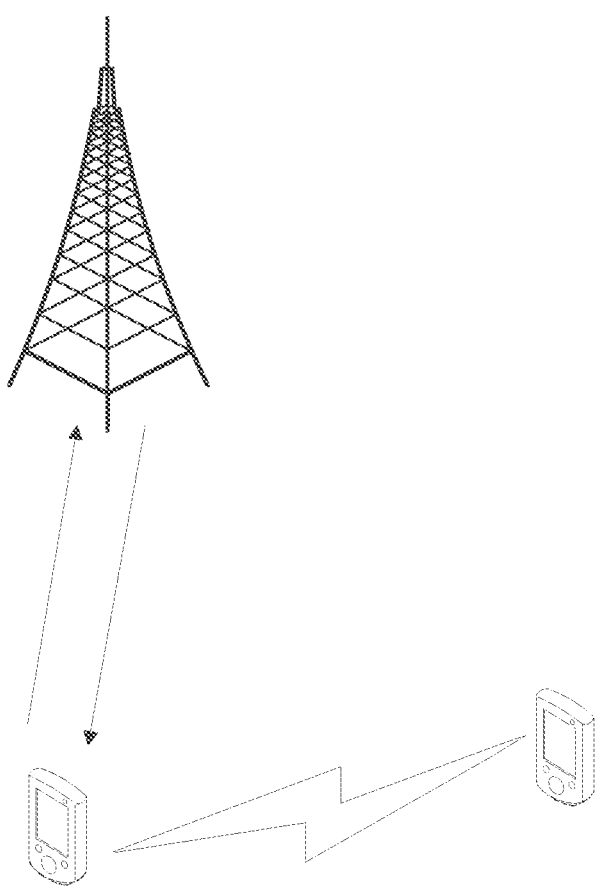
FIG. 1 is a schematic diagram of data transmission supported by a terminal.
Figure 2:
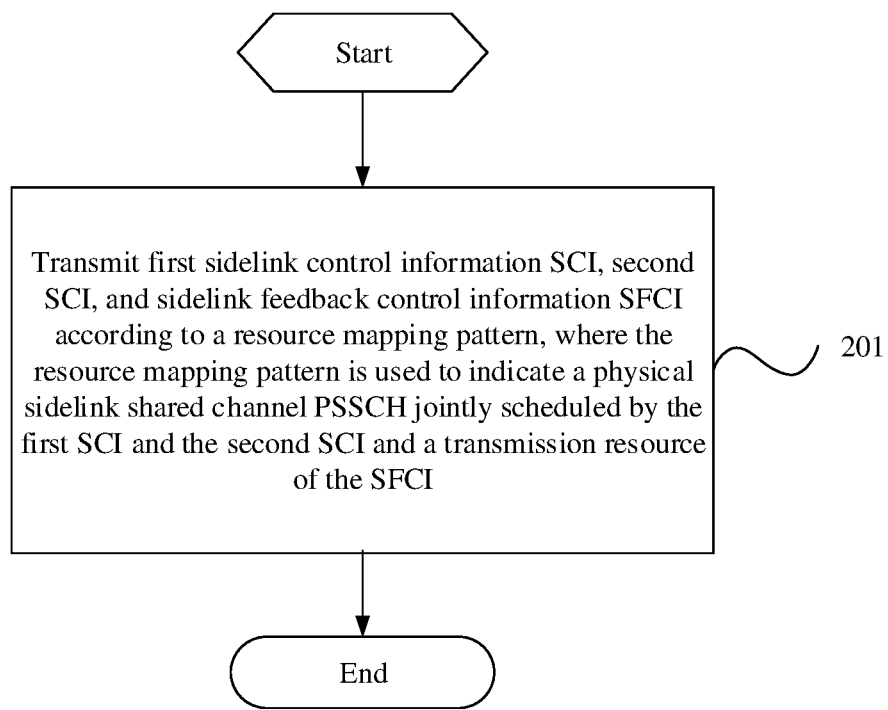
FIG. 2 is a schematic flowchart of an information transmission method according to some embodiments of this disclosure.

As shown in FIG. 2, an information transmission method according to some embodiments of this disclosure includes the following steps.

Step 201: Transmit first sidelink control information (SCI), second SCI, and sidelink feedback control information (SFCI) according to a resource mapping pattern, where the resource mapping pattern is used to indicate transmission resources of the SFCI and a physical sidelink shared channel (PSSCH) jointly scheduled by the first SCI and the second SCI.

With the foregoing step, a terminal applying the method according to some embodiments of this disclosure transmits two-stage SCI and the SFCI according to the resource mapping pattern (which is used to indicate the transmission resources of the SFCI and the PSSCH jointly scheduled by the first SCI and the second SCI), to transmit the SFCI to an peer terminal during transmission of the two-stage SCI.

The terminal applying the method according to some embodiments of this disclosure may be a transmit end or a receive end.

It should be understood that, in this embodiment, the SFCI may be mapped individually, or may be multiplexed with the second SCI for mapping.

Optionally, a first location and a second location are locations from which the second SCI is mapped, and the SFCI and the second SCI are multiplexed for mapping.

Herein, the SFCI and the second SCI are multiplexed together for resource mapping. To be specific, the second SCI and the SFCI as a whole are mapped from the first location in time domain and from the second location in frequency domain. In this case, the first location and the second location are also locations from which the second SCI is mapped. A total size of resources occupied by the second SCI and the SFCI may be configured by a network or indicated by the first SCI.

In addition, optionally, the first location and/or the second location is determined based on at least one of the following:
configuration of the second SCI;
transmitted service type;
location of a demodulation reference signal (DMRS) of the PSSCH;
transmission configuration parameter for SFCI;
information carried by SFCI;
type of SFCI;
number of layers for a PSSCH;
number of layers for the second SCI;
configuration of a DMRS in use;
frequency domain resource assigned for the PSSCH; and
resource configuration of the first SCI.

In this way, considering importance of SFCI transmission, the SFCI is mapped first based on the resource configuration (resource location and resource size) of the first SCI.

The configuration of the second SCI includes at least one of a resource location of the second SCI, a resource size of the second SCI, and a payload size of the second SCI.

The type of the transmitted service includes groupcast, unicast, or broadcast.

The location of the DMRS of the PSSCH is:
a location of the N-th DMRS or N-th DMRS set of the PSSCH, where N is an integer greater than or equal to 1; or
a location of a front-loaded DMRS of the PSSCH.

The transmission configuration parameter of SFCI includes at least one of the number of layers in the SFCI, a code rate of SFCI, and a payload size of SFCI.

The configuration of a DMRS in use includes at least one of a type, the number of symbols, and a multiplexing mode of the DMRS.

Herein, the used DMRS is a DMRS used for SFCI demodulation. The multiplexing mode of the used DMRS includes but is not limited to code division multiplexing CDM and frequency division multiplexing FDM. The type of the DMRS may be type 1 or type 2. The number of symbols of the DMRS may be 1 or 2.

In this embodiment, in the information used to determine the first location and/or the second location, the configuration of the second SCI and the type of the transmitted service may be indicated by the first SCI, prescribed by a protocol, or configured or pre-configured by a network; the location of the DMRS of the PSSCH, the transmission configuration parameter of the SFCI, the information carried by the SFCI, the type of the SFCI, the number of layers for the PSSCH, the number of layers for the second SCI, the configuration of a DMRS in use, and the frequency domain resource assigned for the PSSCH may be indicated by the first SCI, indicated by the second SCI, prescribed by a protocol, or configured or pre-configured by a network.

It should be understood that transmission of the SFCI is not limited to a single layer. Therefore, optionally, in the resource mapping pattern, the SFCI at a target layer is mapped from a first location in time domain and from a second location in frequency domain, where the target layer is a single layer or multiple layers.

Herein, a resource mapping pattern will be mapped to the target layer through the SFCI to complete corresponding single- or multi-layer transmission. The number of layers for the target layer is the number of layers in the SFCI, and may be indicated by the first SCI, indicated by the second SCI, configured or pre-configured by a network, configured by sidelink radio resource control Sidelink RRC, or predefined by a protocol. The first SCI or the second SCI may specifically indicate the number of layers and/or a layer index for mapping of the SFCI. Certainly, by indication or configuration, the number of layers for the target layer may be related to the number of layers for the PSSCH or a physical sidelink control channel PSCCH, or the number of layers for the target layer may be related to the number of layers for the second SCI. For example, the first SCI indicates that the number of layers for the target layer is the same as the number of layers for the PSSCH, or the number of layers for the target layer is the same as the number of layers for the second SCI.

Certainly, in the resource mapping pattern, the SFCI may be mapped in a frequency-first or time-first manner.

Optionally, in the resource mapping pattern, in time domain, the SFCI is
mapped from the last symbol of a mapping resource of the second SCI or the L-th symbol after the last symbol, where L is an integer greater than or equal to 1; or
mapped from the last non-DMRS symbol of a mapping resource of the second SCI or the M-th non-DMRS symbol after the last symbol, where M is an integer greater than or equal to 1; or
mapped from the first symbol or first non-DMRS symbol assigned for the PSSCH, and rate matching or puncturing is performed on the second SCI; or
mapped from a symbol at which the N-th DMRS or the N-th DMRS set or a front-loaded DMRS of the PSSCH is located or the T-th symbol after the symbol, and rate matching or puncturing is performed on the second SCI, where T is an integer greater than or equal to 1.

In this way, the first location may be the last symbol of the mapping resource of the second SCI, or may be the L-th symbol after the last symbol of the mapping resource of the second SCI, or may be the last non-DMRS symbol of the mapping resource of the second SCI (a symbol not carrying the DMRS), or may be the M-th non-DMRS symbol after the last symbol of the mapping resource of the second SCI, or may be the first symbol assigned for PSSCH, or may be the first non-DMRS symbol assigned for the PSSCH, or may be the symbol at which the N-th DMRS or the N-th DMRS set or the front-loaded DMRS of the PSSCH is located, or may be the T-th symbol after the symbol at which the N-th DMRS or the N-th DMRS set or the front-loaded DMRS of the PSSCH is located. Therefore, the SFCI is mapped from the first location in time domain.

For the SFCI that is mapped from the first symbol assigned for the PSSCH or the first non-DMRS symbol and from the symbol at which the N-th DMRS or the N-th DMRS set or the front-loaded DMRS symbol of the PSSCH is located or the T-th symbol after the symbol, considering the location of the second SCI, rate matching or puncturing will be performed on the second SCI.

Optionally, in the resource mapping pattern, in frequency domain, the SFCI is
  mapped from the P-th physical resource block (PRB) of PRBs assigned for the PSSCH, where P is an integer greater than or equal to 1; or
  mapped from the Q-th PRB of the second SCI, where Q is an integer greater than or equal to 1; or
  mapped from the W-th PRB of the first SCI, where W is an integer greater than or equal to 1; or
  mapped from an edge PRB in a target frequency domain region, where the target frequency domain region is a bandwidth center region assigned for the PSSCH.

Herein, the second location may be the P-th PRB in the PRBs assigned for the PSSCH, or may be the Q-th PRB occupied by the second SCI, or may be the W-th PRB occupied by the first SCI, or may be the edge PRB in the target frequency domain region. Therefore, the SFCI is mapped from the second location in frequency domain.

Optionally, values of P, Q, and W may correspond to a PRB in the highest location or a PRB in the lowest location in the PRBs, and the edge PRB of the target frequency domain region is a PRB in the highest location or a PRB in the lowest location in the target frequency domain region. The target frequency domain region is determined based on a size of a frequency domain resource to be occupied by the SFCI. For example, if the SFCI needs to occupy 50 PRBs in frequency domain, the target frequency domain region is 50 PRBs in the middle of the 100 PRBs assigned for the PSSCH (the center of bandwidths assigned for the PSSCH).

Still alternatively, in this embodiment, in the resource mapping pattern, a corresponding target mapping rule is selected for the SFCI from a preset mapping rule based on the type of the SFCI and/or the information carried by the SFCI, and mapping is performed on the SFCI according to the target mapping rule.

Herein, in the resource mapping pattern, the corresponding target mapping rule is selected for the SFCI from the preset mapping rule based on the type of the SFCI and/or the information carried by the SFCI, and thus the mapping is performed on the SFCI according to the target mapping rule.

If the type of the SFCI is a first preset type, in the resource mapping pattern, rate matching is performed on the second SCI during mapping of the SFCI; and if the type of the SFCI is a second preset type, in the resource mapping pattern, puncturing is performed on the second SCI during mapping of the SFCI.

Herein, if different SFCI types are defined for the SFCI in the resource mapping pattern, rate matching or puncturing is selected to be performed on the second SCI during the mapping. For example, the first preset type is type1, and when the type of the SFCI is type1, rate matching is performed on the second SCI during the mapping; the second preset type is type2, and when the type of the SFCI is type2, puncturing is performed on the second SCI during the mapping.

Optionally, if the type of the SFCI is a third preset type, in the resource mapping pattern, the SFCI is mapped from the K-th symbol after the first SCI in time domain, where K is an integer greater than or equal to 1; and
  if the type of the SFCI is a fourth preset type, in the resource mapping pattern, the SFCI is mapped from the X-th non-DMRS symbol after the first DMRS symbol in time domain, where X is an integer greater than or equal to 1.

Herein, the SFCI in the resource mapping pattern corresponds to the type of the SFCI, and the first location is the K-th symbol after the first SCI or the X-th non-DMRS symbol after the first DMRS symbol. For example, the third preset type is type1, and when the SFCI type is type1, mapping is performed from the first (K=1) symbol after the first SCI in time domain; and the fourth preset type is type2, and when the type of the SFCI is type2, mapping is performed from the first (X=1) non-DMRS symbol after the first DMRS symbol in time domain
  Optionally,
  if a size of the information carried by the SFCI is less than a preset threshold, rate matching is performed on the second SCI during mapping of the SFCI; and
  if the size of the information carried by the SFCI is greater than or equal to the preset threshold, puncturing is performed on the second SCI during mapping of the SFCI.

Herein, the SFCI in the resource mapping pattern corresponds to the size of the information carried by the SFCI, and rate matching or puncturing is selected to be performed on the second SCI based on a comparison result of the size of the information carried by the SFCI and the preset threshold during the mapping process. The preset threshold is predefined, or (pre-)configured by a network, or configured by a terminal. When the size of the information carried by the SFCI is less than the preset threshold, rate matching is performed on the second SCI during the mapping; when the size of the information carried by the SFCI is greater than or equal to the preset threshold, puncturing is performed on the second SCI during the mapping.

In this embodiment, optionally, before the transmitting first sidelink control information SCI, second SCI, and sidelink feedback control information SFCI according to a resource mapping pattern, the method further includes:
  obtaining target item information of the SFCI, where the target item information includes at least one of:
  a payload size, a resource size, a resource location, the number of layers, a code rate, and a modulation and coding scheme.

In this way, the specific mapping on the PSSCH can be known by obtaining at least one of the payload size, the resource size, the resource location, the number of layers, the code rate, and the modulation and coding scheme of the SFCI, and then the SFCI can be demodulated.

The target item information is indicated by the first SCI, indicated by the second SCI, configured or pre-configured by a network, predefined by a protocol, or configured by sidelink radio resource control sidelink RRC.

Figure 3:
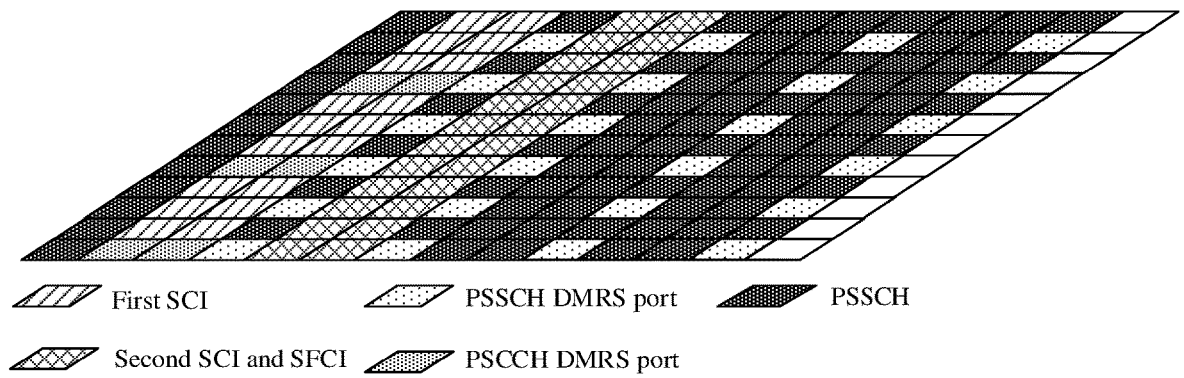
FIG. 3 is a first application schematic diagram of a method according to some embodiments of this disclosure.

The following describes the application of this method according to some embodiments of this disclosure with reference to specific scenarios:

Scenario 1. As shown in FIG. 3, a protocol predefines that time domain resources of the first SCI are the second and third symbols. The first SCI is mapped from the second symbol to allocated available resources in a time-first manner. The first SCI indicates a resource size of the second SCI and SFCI and a resource size of the second SCI.

When the first location is predefined as the next symbol of the first DMRS, the second SCI and the SFCI are mapped from the next symbol (the fifth symbol) of the first DMRS in a frequency-first manner. The second SCI indicates that the number of layers for the PSSCH is 1, the second SCI indicates the payload size of SFCI, and the protocol predefines that the number of layers for SFCI is single for transmission.

A port P1 for transmission of the second SCI and the SFCI is predefined, and a DMRS pattern of the SCI and the SFCI is predefined. Herein, the predefined DMRS pattern of the SCI and the SFCI reuses a DMRS pattern of layer 1 of the PSSCH.

A receive-side terminal receives the first SCI, and demodulates the first SCI to obtain the resource size of the second SCI and SFCI. According to the pre-configured port/layer information, a pre-defined MCS is used to receive data of the second SCI and the SFCI on the pre-defined port P1. After that, the second SCI is demodulated based on the size of the second SCI indicated in the first SCI, and then the SFCI is demodulated from the remaining information based on related information (for example, the payload size) of the SFCI that is indicated in the second SCI.

Scenario 2: A protocol predefines that time domain resources of the first SCI are the second and third symbols. The first SCI is mapped from the second symbol to allocated available resources in a time-first manner. The first SCI indicates a resource size of the second SCI and SFCI and a resource size of the second SCI. The first SCI indicates the number of layers for the PSSCH.

When the first location is determined as a next symbol of the first DMRS, the second SCI and the SFCI are mapped from the next symbol (the fifth symbol) of the first DMRS in a frequency-first manner. The second SCI indicates that the number of layers for the PSSCH is 1, the second SCI indicates the payload size of SFCI, and the protocol predefines that the number of layers for SFCI is single for transmission.

Figure 4:
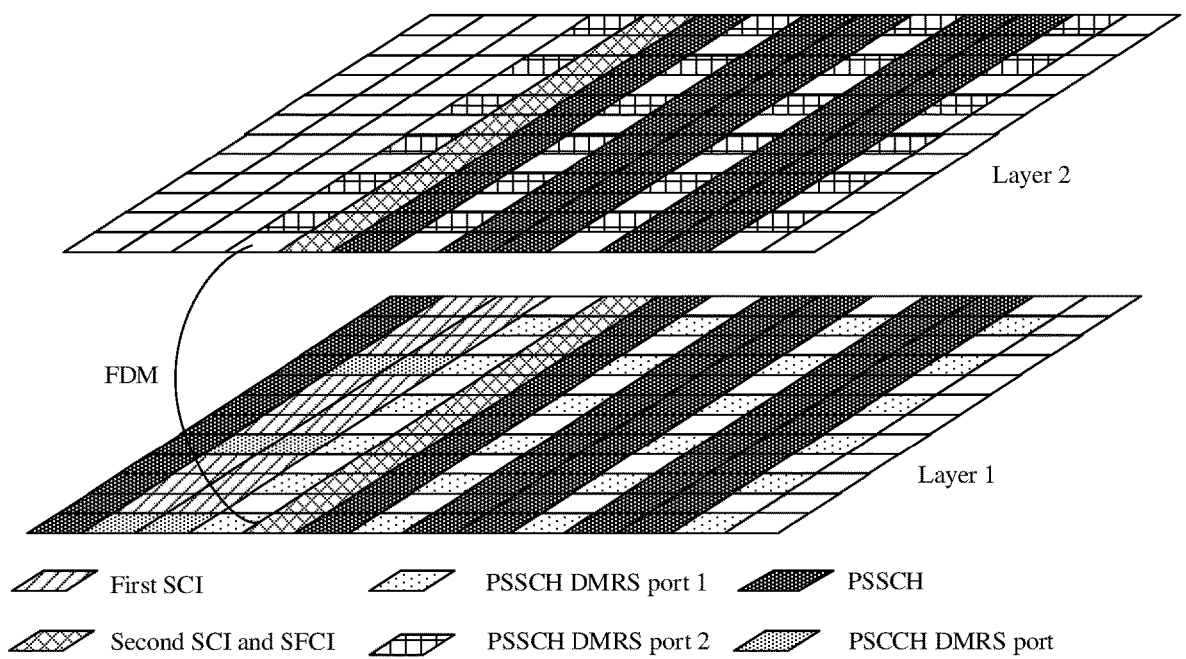
FIG. 4 is a second application schematic diagram of a method according to some embodiments of this disclosure.
Figure 5:
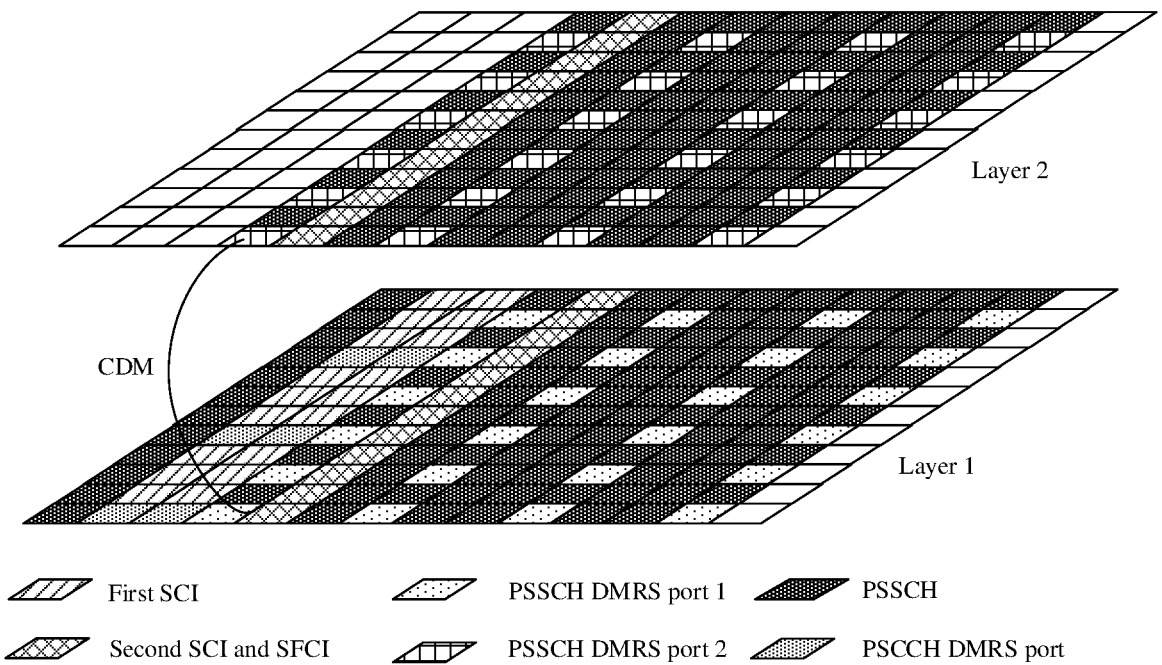
FIG. 5 is a third application schematic diagram of a method according to some embodiments of this disclosure.

If the predefined numbers of layers for the SCI and the SFCI are consistent with the number of layers for the PSSCH:

(a) as shown in FIG. 3, when the first SCI indicates that the PSSCH is one-layer transmission, the second SCI and the SFCI are mapped from the first non-DMRS symbol after the first DMRS; and (b) as shown in FIG. 4 and FIG. 5, when the first SCI indicates that the PSSCH is two-layer transmission, the second SCI and the SFCI are mapped from the first non-DMRS symbol after the first DMRS to all layers, and mapping methods corresponding to all the layers are the same.

A receive-side terminal receives the first SCI, demodulates the first SCI to obtain the number of layers for the PSSCH, and obtains a resource size of the second SCI and SFCI. On the port/layer of the PSSCH, the receive-side terminal receives data of the second SCI and the SFCI by using a predefined MCS. After that, the second SCI is demodulated based on the size of the second SCI indicated in the first SCI, and then the SFCI is demodulated from the remaining information based on related information (for example, the payload size) of the SFCI that is indicated in the second SCI.

Scenario 3: A network pre-configures that time domain resources of the first SCI are the second and third symbols. The first SCI is mapped from the second symbol to allocated available resources in a time-first manner. The first SCI indicates a resource of the second SCI.

The layer number of the second SCI is layer 1, which is associated with a port P1 of the PSSCH. It is predefined that the number of layers for SFCI is consistent with the number of layers for the PSSCH. The second SCI indicates configuration of a DMRS of the PSSCH, and the second SCI indicates a resource size and a resource location of the SFCI.

When the first location is determined as the first available non-DMRS symbol, the SFCI is mapped from the first available non-DMRS symbol after the first SCI, and rate matching or puncturing is performed on the location of the second SCI.

Figure 6:
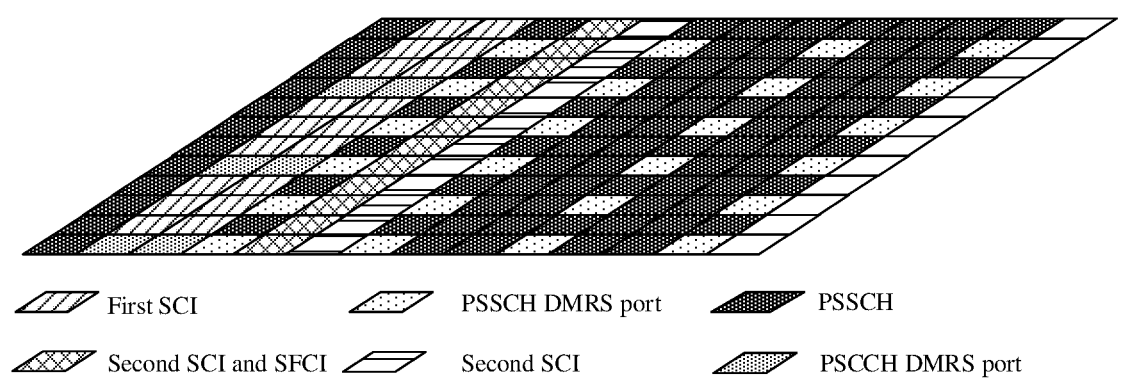
FIG. 6 is a fourth application schematic diagram of a method according to some embodiments of this disclosure.

(a) If the PSSCH is a single-layer transmission, the SFCI is shown in FIG. 6.

Figure 7:
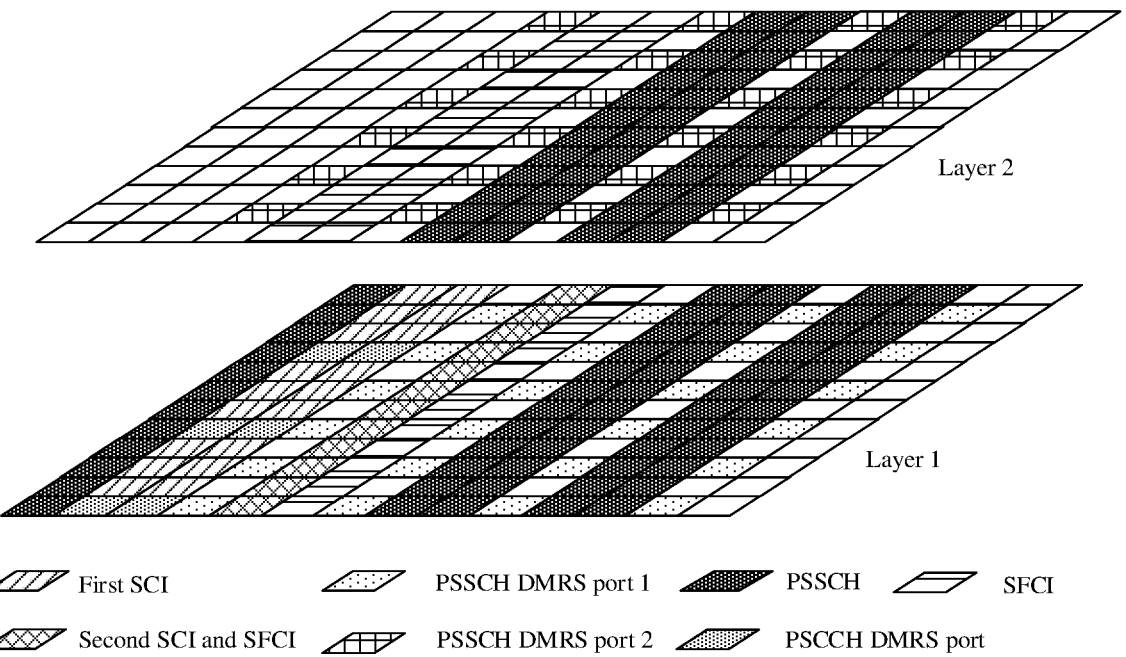
FIG. 7 is a fifth application schematic diagram of a method according to some embodiments of this disclosure.
Figure 8:
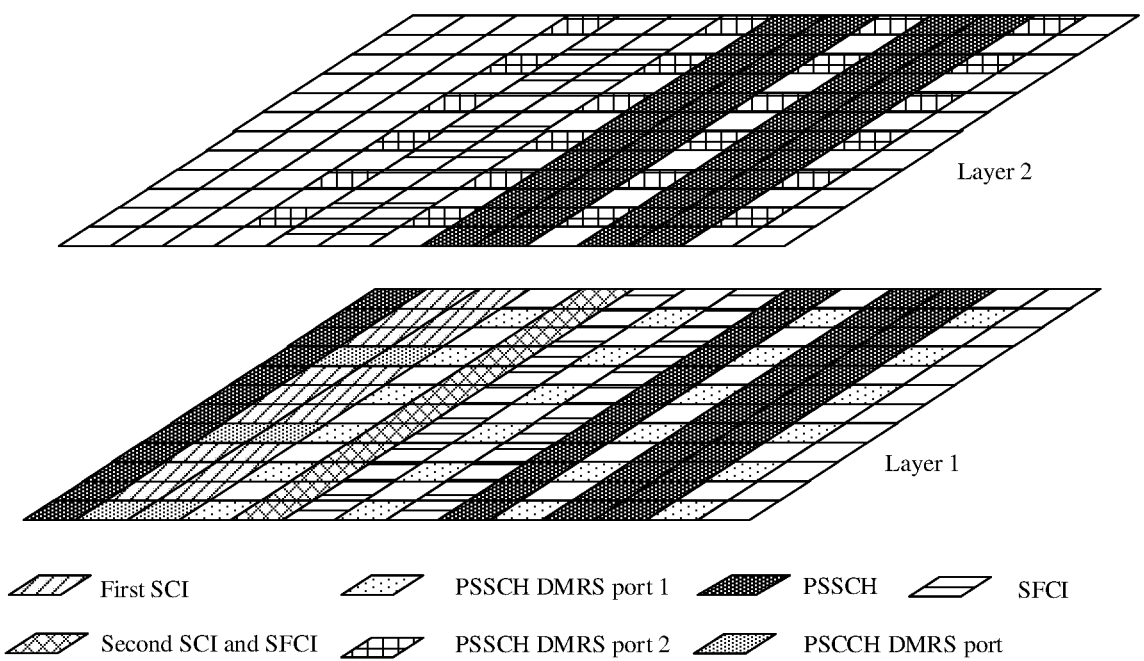
FIG. 8 is a sixth application schematic diagram of a method according to some embodiments of this disclosure.

(b) If the PSSCH is a two-layer transmission, the same mapping rule is used for the two layers for the SFCI, as shown in FIG. 7 and FIG. 8.

The receive-side terminal performs blind detection for the first SCI and obtains a resource of the second SCI. The second SCI is demodulated based on the predefined layer and port information and a resource location and size of the second SCI. The number of layers for the PSCCH, configuration information of the DMRS, and a resource size and location of the SFCI are obtained. The receive-side terminal demodulates information of the SFCI in a corresponding location based on the obtained number of layers and port information and the related information of the SFCI.

Scenario 4: A network pre-configures that time domain resources of the first SCI are the second and third symbols. The first SCI is mapped from the second symbol to allocated available resources in a time-first manner. The first SCI indicates a resource of the second SCI.

The layer number of the second SCI is layer 1, which is associated with a port P1 of the PSSCH. It is predefined that the numbers of layers and ports for SFCI are consistent with the numbers of layers and ports for the second SCI. The second SCI indicates configuration of a DMRS of the PSSCH.

Figure 9:
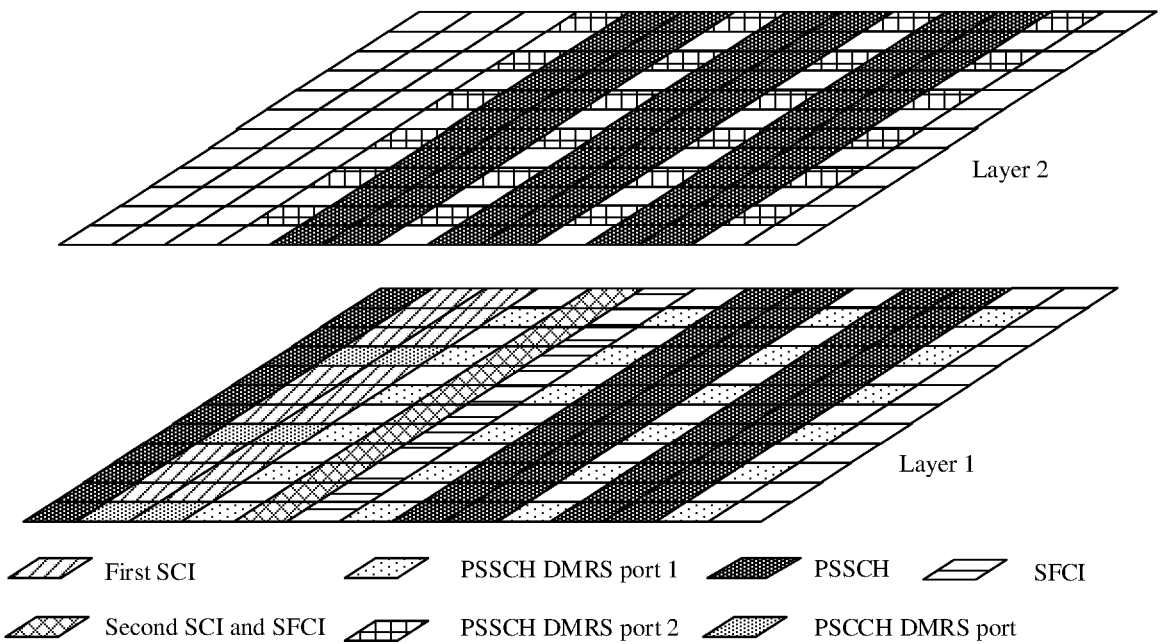
FIG. 9 is a seventh application schematic diagram of a method according to some embodiments of this disclosure.
Figure 10:
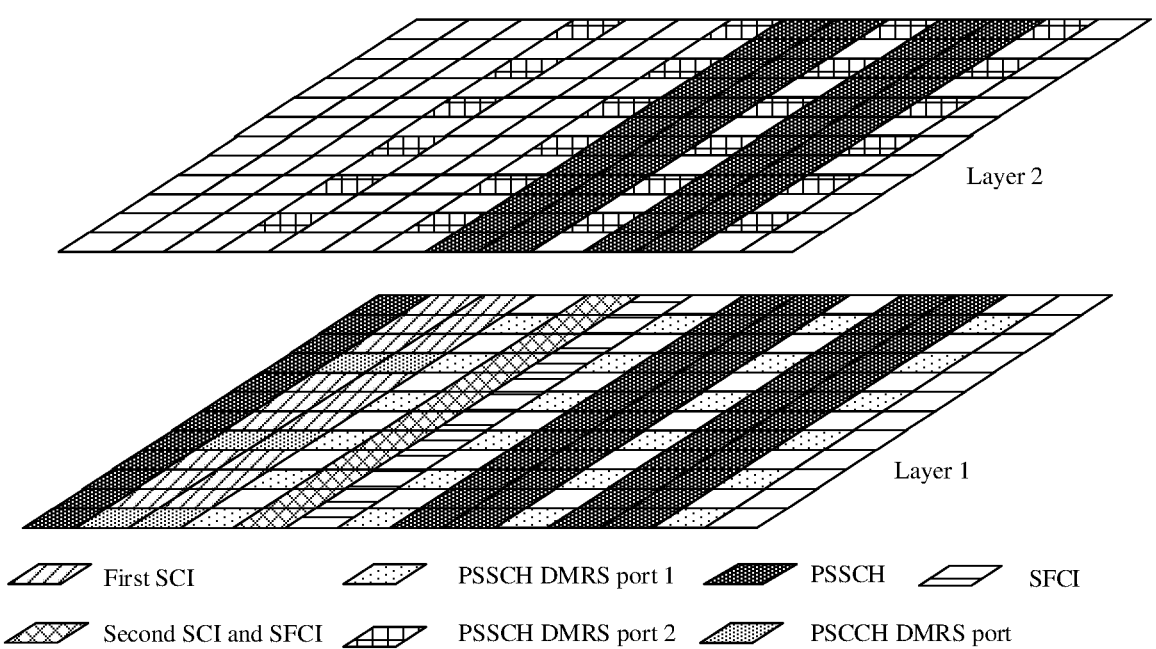
FIG. 10 is an eighth application schematic diagram of a method according to some embodiments of this disclosure.

When the first location is determined as the first available non-DMRS symbol after the first SCI, the SFCI is mapped from the first available non-DMRS symbol after the first SCI, and rate matching or puncturing is performed on the location of the second SCI, as shown in FIG. 9 and FIG. 10.

The receive-side terminal performs blind detection for the first SCI and obtains a resource of the second SCI. The second SCI is demodulated based on the predefined layer and port information and a resource location and size of the second SCI. The number of layers for the PSCCH, configuration information of the DMRS, and a resource size and location of the SFCI are obtained. The receive-side terminal demodulates information of the SFCI in a corresponding location based on the obtained number of layers and port information and the related information of the SFCI.

Certainly, the foregoing scenarios are only some applications, and the applications of the method according to some embodiments of this disclosure are not limited to the foregoing content, and will not be enumerated herein.

In conclusion, according to the method provided in some embodiments of this disclosure, two-stage SCI and SFCI are transmitted according to a resource mapping pattern (which is used to indicate transmission resources of the SFCI and a PSSCH jointly scheduled by first SCI and second SCI), so as to transmit the SFCI to a peer terminal during transmission of the two-stage SCI.

Figure 11:
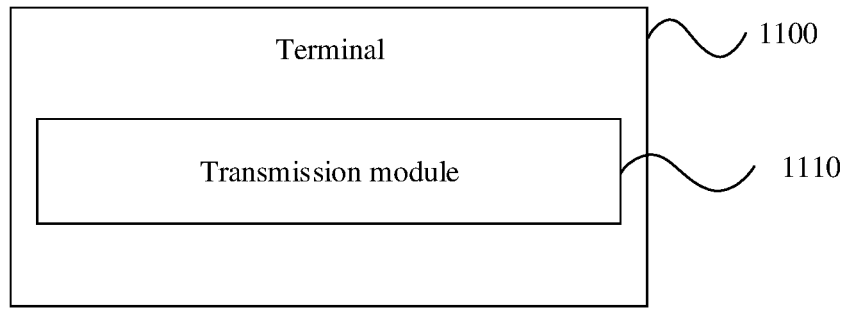
FIG. 11 is a schematic structural diagram of a terminal according to some embodiments of this disclosure.

FIG. 11 is a block diagram of a terminal according to some embodiments of this disclosure. The terminal 1100 shown in FIG. 11 includes a transmission module 1110.

The transmission module 1110 is configured to transmit first sidelink control information (SCI), second SCI, and sidelink feedback control information (SFCI) according to a resource mapping pattern, where the resource mapping pattern is used to indicate transmission resources of the SFCI and a physical sidelink shared channel (PSSCH) jointly scheduled by the first SCI and the second SCI.

Optionally, in the resource mapping pattern, the SFCI is mapped from a first location in time domain and from a second location in frequency domain, where
  the first location and/or the second location is determined based on at least one of the following:
  configuration of the second SCI;
  transmitted service type;
  location of a demodulation reference signal (DMRS) of the PSSCH;
  transmission configuration parameter for SFCI;
  information carried by SFCI;
  type of SFCI;
  number of layers for a PSSCH;
  number of layers for the second SCI;
  configuration of a DMRS in use;
  frequency domain resource assigned for the PSSCH; and
  resource configuration of the first SCI.

Optionally, the configuration of the second SCI includes at least one of a resource location of the second SCI, a resource size of the second SCI, and a payload size of the second SCI.

Optionally, the type of the transmitted service includes groupcast, unicast, or broadcast.

Optionally, the location of the DMRS of the PSSCH is:
  a location of the N-th DMRS or N-th DMRS set of the PSSCH, where N is an integer greater than or equal to 1; or
  a location of a front-loaded DMRS of the PSSCH.

Optionally, the transmission configuration parameter of SFCI includes at least one of the number of layers in the SFCI, a code rate of SFCI, and a payload size of SFCI.

Optionally, the configuration of a DMRS in use includes at least one of a type, the number of symbols, and a multiplexing mode of the DMRS.

Optionally, in the resource mapping pattern, the SFCI at a target layer is mapped from a first location in time domain and from a second location in frequency domain, where the target layer is a single layer or multiple layers.

Optionally, in the resource mapping pattern, in time domain, the SFCI is
  mapped from the last symbol of a mapping resource of the second SCI or the L-th symbol after the last symbol, where L is an integer greater than or equal to 1; or
  mapped from the last non-DMRS symbol of a mapping resource of the second SCI or the M-th non-DMRS symbol after the last symbol, where M is an integer greater than or equal to 1; or
  mapped from the first symbol or first non-DMRS symbol assigned for the PSSCH, and rate matching or puncturing is performed on the second SCI; or
  mapped from a symbol at which the N-th DMRS or the N-th DMRS set or a front-loaded DMRS of the PSSCH is located or the T-th symbol after the symbol, and rate matching or puncturing is performed on the second SCI, where T is an integer greater than or equal to 1.

Optionally, in the resource mapping pattern, in frequency domain, the SFCI is
  mapped from the P-th physical resource block (PRB) of PRBs assigned for the PSSCH, where P is an integer greater than or equal to 1; or
  mapped from the Q-th PRB of the second SCI, where Q is an integer greater than or equal to 1; or
  mapped from the W-th PRB of the first SCI, where W is an integer greater than or equal to 1; or
  mapped from an edge PRB in a target frequency domain region, where the target frequency domain region is a bandwidth center region assigned for the PSSCH.

Optionally, in the resource mapping pattern, a corresponding target mapping rule is selected for the SFCI from a preset mapping rule based on the type of the SFCI and/or the information carried by the SFCI, and mapping is performed on the SFCI according to the target mapping rule.

Optionally, if the type of the SFCI is a first preset type, in the resource mapping pattern, puncturing is performed on the second SCI during mapping of the SFCI; and
  if the type of the SFCI is a second preset type, in the resource mapping pattern, puncturing is performed on the second SCI during mapping of the SFCI.

Optionally, if the type of the SFCI is a third preset type, in the resource mapping pattern, the SFCI is mapped from the K-th symbol after the first SCI in time domain, where K is an integer greater than or equal to 1; and
  if the type of the SFCI is a fourth preset type, in the resource mapping pattern, the SFCI is mapped from the X-th non-DMRS symbol after the first DMRS symbol in time domain, where X is an integer greater than or equal to 1.

Optionally, if a size of the information carried by the SFCI is less than a preset threshold, rate matching is performed on the second SCI during mapping of the SFCI; and
  if the size of the information carried by the SFCI is greater than or equal to the preset threshold, puncturing is performed on the second SCI during mapping of the SFCI.

Optionally, the terminal further includes:
  an obtaining module, configured to obtain target item information of the SFCI, where the target item information includes at least one of:
  a payload size, a resource size, a resource location, the number of layers, a code rate, and a modulation and coding scheme.

Optionally, the target item information is indicated by the first SCI, indicated by the second SCI, configured or preconfigured by a network, predefined by a protocol, or configured by sidelink radio resource control sidelink RRC.

Optionally, the first location and the second location are locations from which the second SCI is mapped, and the SFCI and the second SCI are multiplexed for mapping.

It should be noted that the terminal is a terminal applying the information transmission method of the foregoing embodiment, and the implementation of the information transmission method of the foregoing embodiment is applicable to the terminal, with the same technical effect achieved.

The terminal 1100 can implement each process implemented by the terminal in the embodiments shown in FIG. 2 and FIG. 10. To avoid repetition, details are not described herein again. In some embodiments of this disclosure, two-stage SCI and SFCI are transmitted according to a resource mapping pattern (which is used to indicate transmission resources of the SFCI and a PSSCH jointly scheduled by first SCI and second SCI), so as to transmit the SFCI to a peer terminal during transmission of the two-stage SCI.

Figure 12:
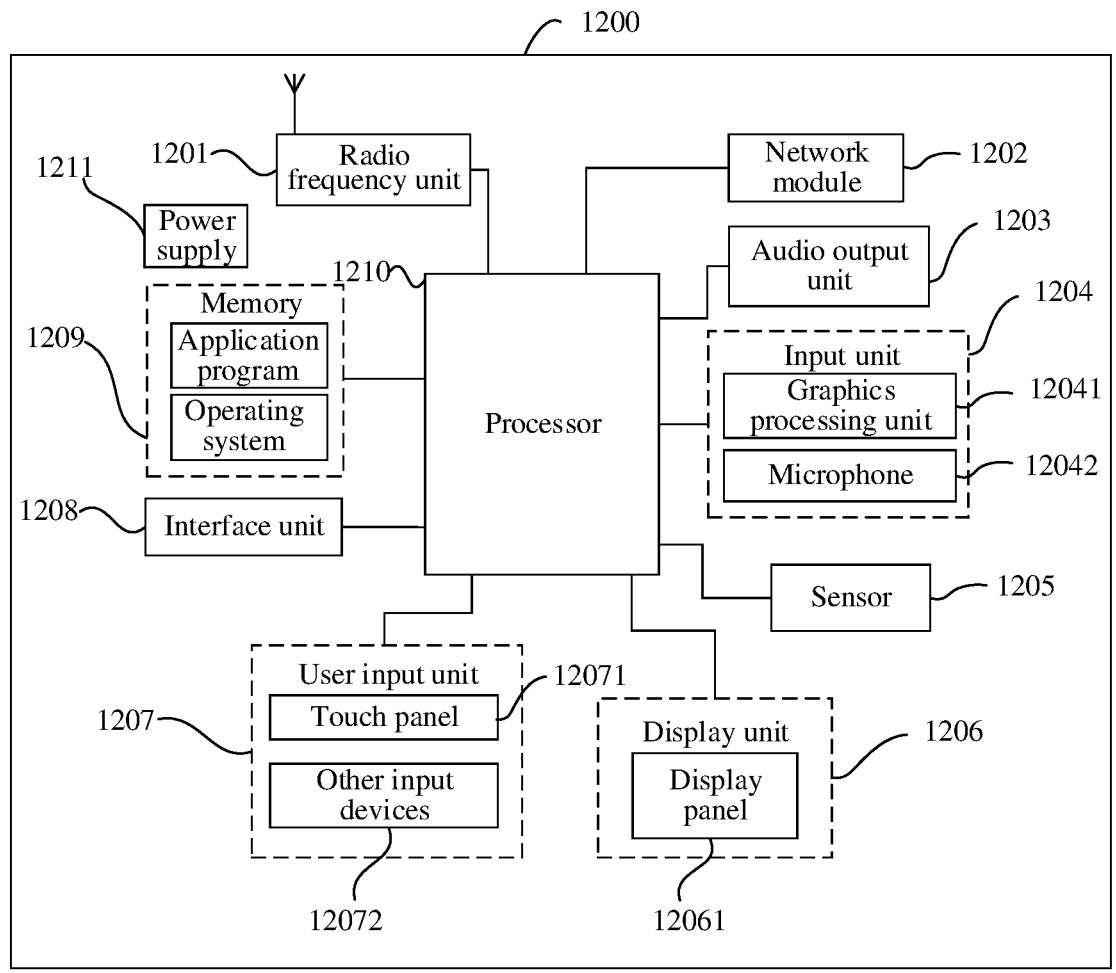
FIG. 12 is a schematic structural diagram of a terminal according to some embodiments of this disclosure.

FIG. 12 is a schematic diagram of a hardware structure of a terminal for implementing the embodiments of this disclosure. The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art can understand that the structure of the terminal shown in FIG. 12 does not constitute any limitation on the terminal, and the terminal may include more or fewer components than shown in the diagram, or some components may be combined, or the components may be arranged in different manners. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 1201 is configured to transmit first sidelink control information (SCI), second SCI, and sidelink feedback control information (SFCI) according to a resource mapping pattern, where the resource mapping pattern is used to indicate transmission resources of the SFCI and a physical sidelink shared channel (PSSCH) jointly scheduled by the first SCI and the second SCI.

Therefore, the terminal transmits two-stage SCI and the SFCI according to a resource mapping pattern (which is used to indicate transmission resources of the SFCI and a PSSCH jointly scheduled by first SCI and second SCI), so as to transmit the SFCI to a peer terminal during transmission of the two-stage SCI.

It should be understood that in some embodiments of this disclosure, the radio frequency unit 1201 may be configured to: receive and send signals in an information receiving/sending process or a call process; and specifically, after receiving downlink data from a base station, send the downlink data to the processor 1210 for processing, and in addition, send uplink data to the base station. Generally, the radio frequency unit 1201 includes but is not limited to an antenna, at least one amplifier, a transceiver, a coupler, a low noise amplifier, a duplexer, and the like. In addition, the radio frequency unit 1201 may also communicate with a network and other devices via a wireless communications system.

The terminal provides a user with wireless broadband Internet access by using the network module 1202, for example, helping the user to transmit and receive e-mails, browse web pages, and access streaming media.

The audio output unit 1203 may convert audio data into an audio signal, and output the audio signal as sound, where the audio data is received by the radio frequency unit 1201 or the network module 1202, or stored in the memory 1209. In addition, the audio output unit 1203 may further provide audio output (for example, a call signal received tone or a message received tone) that is related to a specific function performed by the terminal 1200. The audio output unit 1203 includes a speaker, a buzzer, a receiver, and the like.

The input unit 1204 is configured to receive an audio or video signal. The input unit 1204 may include a graphics processing unit (GPU) 12041 and a microphone 12042, and the graphics processing unit 12041 processes image data of a still picture or a video obtained by an image capture apparatus (for example, a camera) in an image capture mode or a video capture mode. A processed image frame may be displayed on the display unit 1206. The image frame processed by the graphics processing unit 12041 may be stored in the memory 1209 (or another storage medium) or transmitted by using the radio frequency unit 1201 or the network module 1202. The microphone 12042 can receive sounds and process such sounds into audio data. The processed audio data can be converted in a telephone call mode into a format that can be transmitted by the radio frequency unit 1201 to a mobile communication base station, for outputting.

The terminal 1200 may further include at least one sensor 1205, for example, an optical sensor, a motion sensor, and other sensors. Specifically, the optical sensor may include an ambient light sensor and a proximity sensor. The ambient light sensor may adjust luminance of the display panel 12061 based on brightness of ambient light, and the proximity sensor may turn off the display panel 12061 and/or backlight when the terminal 1200 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not further described herein.

The display unit 1206 is configured to display information input by the user or information provided to the user. The display unit 1206 may include the display panel 12061. The display panel 12061 may be configured in a form of a liquid crystal display (LCD), an organic light-emitting diode (OLED), or the like.

The user input unit 1207 may be used to receive input digit or character information, and generate key signal input that is related to user setting and function control of the terminal. Specifically, the user input unit 1207 includes a touch panel 12071 and other input devices 12072. The touch panel 12071, or referred to as a touchscreen, may capture a touch operation performed by a user on or near the touch panel 12071 (for example, an operation performed by the user on the touch panel 12071 or near the touch panel 12071 by using any appropriate object or accessory such as a finger or a stylus). The touch panel 12071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 1210, and receives and executes a command transmitted by the processor 1210. In addition, the touch panel 12071 may be implemented in a plurality of forms, for example, as a resistive, capacitive, infrared, or surface acoustic wave touch panel. In addition to the touch panel 12071, the user input unit 1207 may further include other input devices 12072. Specifically, the other input devices 12072 may include but are not limited to a physical keyboard, a function key (for example, a volume control key or a switch key), a trackball, a mouse, and a joystick. Details are not described herein.

Further, the touch panel 12071 may cover the display panel 12061. After detecting a touch operation on or near the touch panel 12071, the touch panel 12071 transmits the touch operation to the processor 1210 to determine a type of a touch event. Then the processor 1210 provides corresponding visual output on the display panel 12061 based on the type of the touch event. In FIG. 12, the touch panel 12071 and the display panel 12061 serve as two separate components to implement input and output functions of the terminal. However, in some embodiments, the touch panel 12071 and the display panel 12061 may be integrated to implement the input and output functions of the terminal. This is not specifically limited herein.

The interface unit 1208 is an interface between an external apparatus and the terminal 1200. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1208 may be used to receive input (for example, data information and electric power) from the external apparatus, and transmit the received input to one or more elements in the terminal 1200; or may be used to transmit data between the terminal 1200 and the external apparatus.

The memory 1209 may be configured to store software programs and various data. The memory 1209 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 1209 may include a high-speed random access memory, and may further include a non-volatile memory such as a disk storage device, a flash memory device, or another volatile solid-state storage device.

The processor 1210 is a control center of the terminal, and is connected to all components of the terminal by using various interfaces and lines. By running or executing a software program and/or a module stored in the memory 1209 and invoking data stored in the memory 1209, the processor 1210 executes various functions of the terminal and processes data, so as to perform overall monitoring on the terminal. The processor 1210 may include one or more processing units. Optionally, the processor 1210 may integrate an application processor and a modem processor. The application processor mainly processes an operating system, a user interface, an application program, and the like. The modem processor mainly processes wireless communication. It can be understood that the modem processor may alternatively be not integrated in the processor 1210.

The terminal 1200 may further include a power supply 1211 (for example, a battery) that supplies power to the components. Optionally, the power supply 1211 may be logically connected to the processor 1210 by using a power management system, so as to implement functions such as charging management, discharging management, and power consumption management by using the power management system.

In addition, the terminal 1200 includes some functional modules that are not shown. Details are not described herein again.

Optionally, some embodiments of this disclosure further provide a terminal, including a processor, a memory, and a program stored in the memory and capable of running on the processor. When the program is executed by the processor, the processes of the foregoing embodiments of the information transmission method are implemented, with same technical effects achieved. To avoid repetition, details are not described herein again.

Some embodiments of this disclosure further provide a readable storage medium, where the readable storage medium stores a program, and when the program is executed by a processor, the processes of the embodiments of the foregoing information transmission method are implemented, with the same technical effect achieved. To avoid repetition, details are not described herein again. For example, the readable storage medium is a read-only memory (ROM), a random access memory (RAM), a magnetic disk, an optical disc, or the like.

It can be understood that the embodiments described in some embodiments of the present disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An information transmission method, comprising:
transmitting first sidelink control information (SCI), second SCI, and sidelink feedback control information (SFCI) according to a resource mapping pattern, wherein the resource mapping pattern is used to indicate transmission resources of the SFCI and a physical sidelink shared channel (PSSCH) jointly scheduled by the first SCI and the second SCI.

2. The method according to claim 1, wherein in the resource mapping pattern, the SFCI is mapped from a first location in time domain and from a second location in frequency domain, wherein
the first location and/or the second location is determined based on at least one of the following:
configuration of the second SCI;
transmitted service type;
location of a demodulation reference signal (DMRS) of the PSSCH;
transmission configuration parameter for SFCI;
information carried by SFCI;
type of SFCI;
number of layers for a PSSCH;
number of layers for the second SCI;
configuration of a DMRS in use;
frequency domain resource assigned for the PSSCH; or
resource configuration of the first SCI.

3. The method according to claim 2, wherein the configuration of the second SCI comprises at least one of a resource location of the second SCI, a resource size of the second SCI, or a payload size of the second SCI.

4. The method according to claim 2, wherein the type of the transmitted service comprises groupcast, unicast, or broadcast.

5. The method according to claim 2, wherein the location of the DMRS of the PSSCH is:
a location of the N-th DMRS or N-th DMRS set of the PSSCH, wherein N is an integer greater than or equal to 1; or
a location of a front-loaded DMRS of the PSSCH.

6. The method according to claim 2, wherein the transmission configuration parameter of SFCI comprises at least one of the number of layers for SFCI, a code rate of SFCI, or a payload size of SFCI.

7. The method according to claim 2, wherein the configuration of a DMRS in use comprises at least one of a type, the number of symbols, or a multiplexing mode of the DMRS.

8. The method according to claim 2, wherein in the resource mapping pattern, the SFCI at a target layer is mapped from a first location in time domain and from a second location in frequency domain, wherein the target layer is a single layer or multiple layers.

9. The method according to claim 2, wherein in the resource mapping pattern, in time domain, the SFCI is
mapped from the last symbol of a mapping resource of the second SCI or the L-th symbol after the last symbol, wherein L is an integer greater than or equal to 1; or
mapped from the last non-DMRS symbol of a mapping resource of the second SCI or the M-th non-DMRS symbol after the last symbol, wherein M is an integer greater than or equal to 1; or
mapped from the first symbol or first non-DMRS symbol assigned for the PSSCH, and rate matching or puncturing is performed on the second SCI; or
mapped from a symbol at which the N-th DMRS or the N-th DMRS set or a front-loaded DMRS of the PSSCH is located or the T-th symbol after the symbol, and rate matching or puncturing is performed on the second SCI, wherein T is an integer greater than or equal to 1.

10. The method according to claim 2, wherein in the resource mapping pattern, in frequency domain, the SFCI is
mapped from the P-th physical resource block (PRB) of PRBs assigned for the PSSCH, wherein P is an integer greater than or equal to 1; or
mapped from the Q-th PRB of the second SCI, wherein Q is an integer greater than or equal to 1; or
mapped from the W-th PRB of the first SCI, wherein W is an integer greater than or equal to 1; or
mapped from an edge PRB in a target frequency domain region, wherein the target frequency domain region is a bandwidth center region assigned for the PSSCH.

11. The method according to claim 2, wherein in the resource mapping pattern, a corresponding target mapping rule is selected for the SFCI from a preset mapping rule based on the type of the SFCI and/or the information carried by the SFCI, and mapping is performed on the SFCI according to the target mapping rule.

12. The method according to claim 11, wherein if the type of the SFCI is a first preset type, in the resource mapping pattern, rate matching is performed on the second SCI during mapping of the SFCI; and
if the type of the SFCI is a second preset type, in the resource mapping pattern, puncturing is performed on the second SCI during mapping of the SFCI.

13. The method according to claim 11, wherein
if the type of the SFCI is a third preset type, in the resource mapping pattern, the SFCI is mapped from the K-th symbol after the first SCI in time domain, wherein K is an integer greater than or equal to 1; and
if the type of the SFCI is a fourth preset type, in the resource mapping pattern, the SFCI is mapped from the X-th non-DMRS symbol after the first DMRS symbol in time domain, wherein X is an integer greater than or equal to 1.

14. The method according to claim 11, wherein
if a size of the information carried by the SFCI is less than a preset threshold, rate matching is performed on the second SCI during mapping of the SFCI; and
if the size of the information carried by the SFCI is greater than or equal to the preset threshold, puncturing is performed on the second SCI during mapping of the SFCI.

15. The method according to claim 1, wherein before the transmitting first sidelink control information (SCI), second SCI, and sidelink feedback control information (SFCI) according to a resource mapping pattern, the method further comprises:
obtaining target item information of the SFCI, wherein the target item information comprises at least one of:
a payload size, a resource size, a resource location, the number of layers, a code rate, or a modulation and coding scheme.

16. The method according to claim 15, wherein the target item information is indicated by the first SCI, indicated by the second SCI, configured or pre-configured by a network, predefined, or configured by sidelink radio resource control sidelink RRC.

17. The method according to claim 2, wherein the first location and the second location are locations from which the second SCI is mapped, and the SFCI and the second SCI are multiplexed for mapping.

18. A terminal, comprising a processor, a memory, and a program stored in the memory and capable of running on the processor, wherein when the program is executed by the processor, the steps of an information transmission method are implemented, wherein the information transmission method comprises:

transmitting first sidelink control information (SCI), second SCI, and sidelink feedback control information (SFCI) according to a resource mapping pattern, wherein the resource mapping pattern is used to indicate transmission resources of the SFCI and a physical sidelink shared channel (PSSCH) jointly scheduled by the first SCI and the second SCI.

19. The terminal according to claim 18, wherein in the resource mapping pattern, the SFCI is mapped from a first location in time domain and from a second location in frequency domain, wherein the first location and/or the second location is determined based on at least one of the following:

configuration of the second SCI;

transmitted service type;

location of a demodulation reference signal (DMRS) of the PSSCH;

transmission configuration parameter for SFCI;

information carried by SFCI;

type of SFCI;

number of layers for a PSSCH;

number of layers for the second SCI;

configuration of a DMRS in use;

frequency domain resource assigned for the PSSCH; or resource configuration of the first SCI.

20. A non-transitory, readable storage medium, wherein the non-transitory, readable storage medium stores a program, and when the program is executed by a processor, the steps of an information transmission method are implemented, wherein the information transmission method comprises:

transmitting first sidelink control information (SCI), second SCI, and sidelink feedback control information (SFCI) according to a resource mapping pattern, wherein the resource mapping pattern is used to indicate transmission resources of the SFCI and a physical sidelink shared channel (PSSCH) jointly scheduled by the first SCI and the second SCI.

* * * * *